(12) United States Patent
Galluzzi et al.

(10) Patent No.: US 11,250,808 B2
(45) Date of Patent: Feb. 15, 2022

(54) DISPLAY SYSTEM AND RELATED VEHICLE AND METHOD

(71) Applicants: STMicroelectronics (Grand Ouest) SAS, Le Mans (FR); STMicroelectronics S.r.l., Agrate Brianza (IT)

(72) Inventors: Alessandro Vittorio Galluzzi, San Giuliano Milanes (IT); Mustapha Ghanmi, Le Mans (FR)

(73) Assignees: STMICROELECTRONICS S.R.L., Agrate Brianza (IT); STMICROELECTRONICS (GRAND OUEST) SAS, Le Mans (FR)

( * ) Notice: Subject to any disclaimer, the term of this patent is extended or adjusted under 35 U.S.C. 154(b) by 0 days.

(21) Appl. No.: 16/858,397

(22) Filed: Apr. 24, 2020

(65) Prior Publication Data
US 2020/0357356 A1 Nov. 12, 2020

(30) Foreign Application Priority Data
May 10, 2019 (IT) .................. 102019000006730

(51) Int. Cl.
*G09G 5/00* (2006.01)

(52) U.S. Cl.
CPC ......... *G09G 5/001* (2013.01); *G09G 2340/16* (2013.01); *G09G 2360/10* (2013.01); *G09G 2380/10* (2013.01)

(58) Field of Classification Search
CPC ...... G09G 2330/12; G09G 3/006; G09G 5/39; G09G 2340/16; G09G 2360/18;
(Continued)

(56) References Cited

U.S. PATENT DOCUMENTS

| 5,307,056 A | 4/1994 | Urbanus |
|---|---|---|
| 5,471,225 A | 11/1995 | Parks |

(Continued)

FOREIGN PATENT DOCUMENTS

| CN | 101729840 A | 6/2010 |
|---|---|---|
| CN | 102946531 A | 2/2013 |

(Continued)

OTHER PUBLICATIONS

Yingying, Zhu et al., "Video forgery detection and multi-granularity location based on video perceptual hashing", Journal of Image and Graphics, Shenzhen, China, Dec. 2012, 9 pages.

*Primary Examiner* — Hau H Nguyen
(74) *Attorney, Agent, or Firm* — Slater Matsil, LLP

(57) ABSTRACT

A display system comprises a processing circuit configured to receive image data from a video source, and generate a current image frame by generating pixel data as a function of the image data and storing the pixel data to a frame buffer. A graphic video driver is configured to display the image frame by reading the pixel data from the frame buffer and generating drive signals for the graphic display as a function of the pixel data read. The processing circuit also is configured to insert integrity data into the pixel data of the current image frame, wherein the position of the integrity data within the pixel data changes. The display system comprises a further processing circuit configured to read the pixel data from the frame buffer and verify whether the position of the integrity data within the pixel data changes.

19 Claims, 3 Drawing Sheets

(58) Field of Classification Search
CPC ... G09G 5/393; G06T 7/0002; G06F 11/0739; G06F 11/2221; G06F 11/263; G06F 21/64; G06F 2221/033; G06F 3/1415
See application file for complete search history.

(56) References Cited

U.S. PATENT DOCUMENTS

| | | |
|---|---|---|
| 7,460,101 B2 | 12/2008 | Lee et al. |
| 8,644,626 B2 | 2/2014 | Yu |
| 2007/0013693 A1* | 1/2007 | Hedrick ............... G01C 23/005 345/419 |
| 2007/0046670 A1 | 3/2007 | Hendrick et al. |
| 2012/0203997 A1 | 8/2012 | Block |
| 2013/0120437 A1 | 5/2013 | Bajaj et al. |
| 2016/0195408 A1* | 7/2016 | Block .................... G06F 3/147 340/945 |
| 2016/0379332 A1 | 12/2016 | Krutsch et al. |
| 2017/0177458 A1 | 6/2017 | Viggers et al. |
| 2018/0165814 A1* | 6/2018 | Gulati .................... G06T 7/001 |
| 2019/0045089 A1 | 2/2019 | Tanner et al. |
| 2019/0155711 A1* | 5/2019 | Viggers .................. G06T 1/60 |

FOREIGN PATENT DOCUMENTS

| | | |
|---|---|---|
| CN | 103003863 A | 3/2013 |
| CN | 109379642 A | 2/2019 |
| EP | 3182399 A1 | 6/2017 |
| WO | 2017053029 A1 | 3/2017 |

* cited by examiner

DISPLAY SYSTEM AND RELATED VEHICLE AND METHOD

CROSS-REFERENCE TO RELATED APPLICATIONS

This application claims priority to Italian Patent Application No. 102019000006730, filed on May 10, 2019, which application is hereby incorporated herein by reference.

TECHNICAL FIELD

Embodiments of the present disclosure relate to display systems.

BACKGROUND

FIG. 1 shows a typical display system 1. Generally, a display system comprises a video source 100 providing (analog or digital) image/video data IMG comprising a sequence of images and a graphic display 108. Generally, any suitable image/video source 100 may be used, such as:
- a camera, such as a CMOS camera;
- a non-volatile memory having stored the image data IMG, such as a hard-disk or a flash memory; or
- a communication interface configured to receive the image data IMG from another device, such as a remote server.

Generally, the image/video source 100 may be configured to provide the image data IMG in any suitable format. For example, the image data IMG may consist of gray-scale images, but also color images may be used. For example, in the case of color images, the image data IMG may consist of RGB pixel data. Such color images may however also be provided in other formats. For example, a camera 100 may provide image data IMG according to a Bayer, a CYGM (cyan, yellow, green, magenta), a RGBE (red, green, blue, emerald) or a CMYW (cyan, magenta, yellow, and white) pattern. Moreover, the image data IMG may also be provided in compressed format, including both lossy and lossless formats. For example, lossy formats may include JPEG or MPEG (e.g. MPEG-4 Part 14 or MP4) compressed data, while lossless formats may include a sequence of GIF images.

Similarly, any suitable graphic/video display 108 may be used. For example, in various embodiments, the graphic display is a fixed pixel display having a given resolution, such as a Light Emitting Diode (LED) display, a Cathode Ray Tube (CRT) or a Liquid-crystal display (LCD).

In order to provide the image data IMG to the graphic display 108, the display system 1 usually comprises a frame buffer 104. For example, such a frame buffer is usually implemented with a RAM (Random Access Memory).

Specifically, such a frame buffer 104 is usually arranged to store pixel data of the current frame to be displayed by the graphic display 108. In this respect, as mentioned before, the graphic display 108 usually has a given display resolution, such as 640×480 pixels, 1920×1080 pixels, etc., and a respective color depth, such as 8, 16 or 24 bits. Accordingly, the frame buffer 104 comprises a memory having a given number of memory locations, wherein each memory location is associated with a given pixel of the graphic display 108. Moreover, each memory location comprises a number of bits in order to store the respective color of the pixel. For example, the pixels of a color image may be specified via memory locations having 24 bits (8 bits for red, green and blue, respectively).

Accordingly, in the example considered, a processing circuit 102 may receive the image data IMG from the image/video source 100, elaborate the image data IMG in order to determine the respective pixel data PD of the current frame to be displayed on the graphic display 108, and store the pixel data PD to the frame buffer 104. For example, such an elaboration may include reconstructing the pixel data PD from a Bayer patter, decoding a compressed image/video, etc. Generally, the processing circuit 102, such as a microprocessor programmed via software instruction and/or a hardware digital circuit, e.g. a Digital Signal Processor (DSP), may also perform more complex image processing operations, e.g. in order to detect objects in the image data IMG/pixel data PD.

A graphic driver circuit 106 may thus read respective pixel data PD' from the frame buffer 104 and generate respective drive signals DRV for the graphic display 108. For example, usually the graphic driver circuit 106 comprises one or more digital-to-analog converters for converting the digital pixel data PD' into analog drive signals DRV for the graphic display 108.

Accordingly, often the frame buffer 104 is implemented with a RAM comprising a first DMA (Direct Memory Access) channel for exchanging data with the processing circuit 102 and a second DMA channel for exchanging data with the graphic driver circuit 106. Alternatively or additionally, the display system 1 may also comprise two or more frame buffers 104, wherein the processing circuit 102 updates the pixel data PD of the first or the second frame buffers 104, and the graphic driver circuit 106 reads the pixel data PD' from the frame buffers 104, which is currently not updated by the processing circuit 102, thereby permitting that the processing circuit 102 and the graphic driver circuit 106 operate rather independently.

Such display systems are well known in the art. For example, reference can be made to documents U.S. Pat. Nos. 5,471,225 A, 5,307,056 A or 7,460,101 B2.

The inventors have observed that the display system 1 shown in FIG. 1 may also be used for safety critical applications. For example, the display system 1 may be used for automotive applications, such as a rear camera system. In this case, the video source 100 may be a camera mounted at the rear of a vehicle, such as a car. Conversely, the display 108 may be mounted in the cockpit of the vehicle and may thus display a rear view of the vehicle to a driver of the vehicle. For example, in this case, the processing circuit 102 may also elaborate the image data IMG, e.g. in order to assist the driver during a parking activity, detect obstacles, etc.

However, due to a malfunction of the processing system 102, the frame/image data IMG may not be elaborated correctly, e.g. because the software application or hardware circuit configured to elaborate the frame/image data IMG and/or store the elaborated pixel data PD to the frame buffer 104 may not operate correctly, possibly causing the pixel data PD stored to the frame buffer 104 to not change, whereby the graphic driver circuit 106 will always show the same screenful/image on the graphic display 108, i.e. the frame display hangs/is frozen.

In many applications, such frozen images (which do not correctly reflect the original image data IMG) may be dangerous, e.g. for the driver of the vehicle or for persons passing the rear of the vehicle.

SUMMARY

In view of the above, it is an objective of various embodiments of the present disclosure to provide solutions able to detect a malfunctioning of the display system, in particular of the respective processing system, and possibly warn a user of the display system.

According to one or more embodiments, one or more of the above objectives is achieved by means of a display system having the features specifically set forth in the claims that follow. Embodiments moreover concern a related vehicle and method.

The claims are an integral part of the technical teaching of the disclosure provided herein.

As mentioned before, various embodiments of the present disclosure relate to a display system. As described in the foregoing, such a display system comprises a video source configured to generate image data comprising a sequence of images, a graphic display having a given resolution of pixels, and a frame buffer configured to store an image frame to be displayed on the graphic display, the image frame comprising pixel data for the graphic display.

In various embodiments, a processing circuit is configured to receive the image data from the video source, and generate a current image frame by generating the pixel data as a function of the image data and storing the pixel data to the frame buffer. In various embodiments, a graphic video driver is configured to display the image frame by reading the pixel data from the frame buffer and generating drive signals for the graphic display as a function of the pixel data read.

In various embodiments the processing circuit is configured to insert integrity data into the pixel data of the current image frame, wherein the position of the integrity data within the pixel data changes. For example, the processing circuit may elaborate the image data received from the video source in order to generate the pixel data of the current image frame, store the pixel data of the current image frame to a memory, and copy the pixel data of the current image frame stored to the memory to the frame buffer. Accordingly, the processing circuit may determine a current position of the integrity data within the pixel data of the current image frame, and either store the integrity data to the memory location in the memory associated with the current position before the pixel data of the current image frame are copied to the frame buffer, or store the integrity data to the memory location in the frame buffer associated with the current position after the pixel data of the current image frame are copied to the frame buffer.

Accordingly, the display system may comprise a further processing circuit configured to read the pixel data from the frame buffer and verify whether the position of the integrity data within the pixel data changes.

For example, in various embodiments, the processing circuit is configured to change the position of the integrity data within the pixel data for each frame or each given number of frames. Accordingly, the further processing circuit may verify whether the position of the integrity data within the pixel data changes for each frame or each given number of frames, respectively.

For example, in various embodiments, the processing circuit may be configured to, when the current image frame is the first image frame, determine the position of the integrity data within the pixel data of the current image frame as a function of a fixed initial value. Conversely, when the current image frame is not the first image frame, the processing circuit may determine the position of the integrity data within the pixel data of the current image frame as a function of the position of the integrity data within the pixel data of a previous image frame. Additionally or alternatively, the integrity data may comprise a position data field. In this case the processing circuit may determine the position of the integrity data within the pixel data of a next image frame and store data identifying the position of the integrity data within the pixel data of a next image frame to the position data field.

In various embodiments, the integrity data may comprise an integrity data field. In this case, the processing circuit may store, e.g., a fixed bit sequence to the integrity data field, which permits to verify the integrity data.

BRIEF DESCRIPTION OF THE DRAWINGS

Embodiments of the present disclosure will now be described with reference to the annexed drawings, which are provided purely by way of non-limiting example and in which.

DETAILED DESCRIPTION OF ILLUSTRATIVE EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
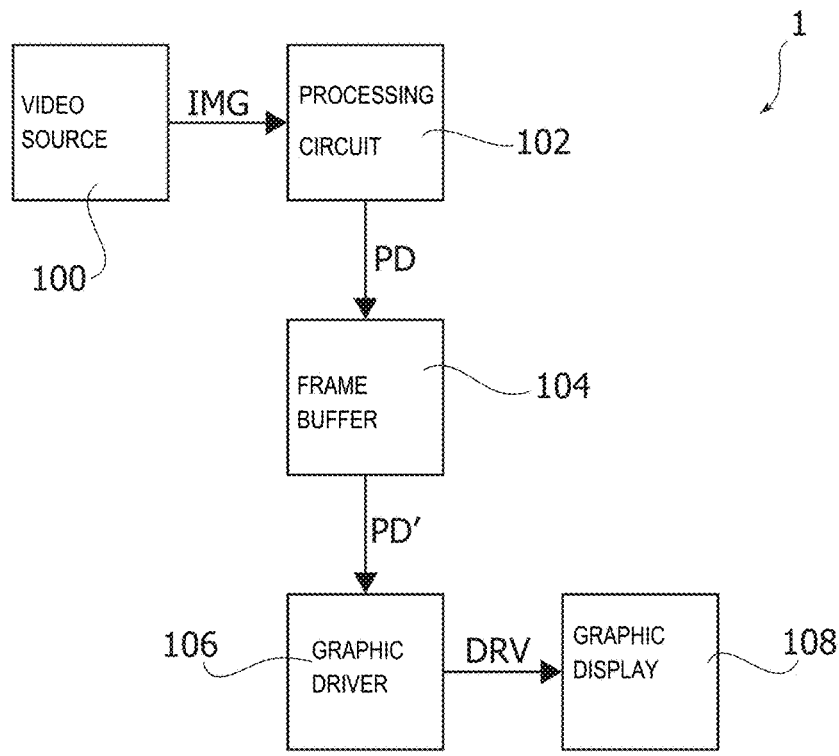
FIG. 1 shows a typical display system.

In the following FIGS. 2 to 5 parts, elements or components which have already been described with reference to FIG. 1 are denoted by the same references previously used in such Figures; the description of such previously described elements will not be repeated in the following in order not to overburden the present detailed description.

As mentioned before, various embodiments of the present disclosure provide solutions able to detect a malfunctioning of the display system, in particular of the respective processing system configured to store data to a frame buffer of the display system.

Figure 2:
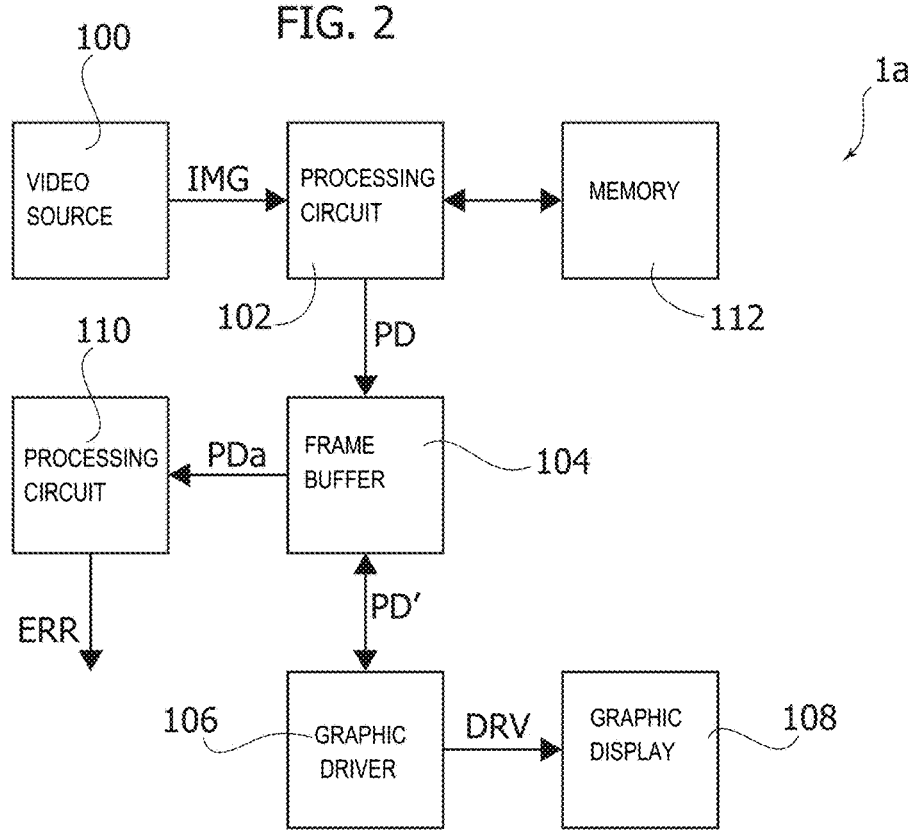
FIG. 2 shows an embodiment of a display system according to the present disclosure.

FIG. 2 shown an embodiment of a display system is in accordance with the present disclosure.

Specifically, also in this case, the display system is comprises:
- a video source 100 configured to generate image data IMG comprising a sequence of images;
- a frame buffer 104; and
- a graphic display 108.

In the embodiment considered, a processing circuit 102 is configured to generate pixel data PD as a function of the image data IMG and store said pixel data PD to the frame buffer 104, and a graphic video driver 106 is configured to read the pixel data PD' from the frame buffer 104 and generate drive signals DRV for the graphic display 108 as a function of the pixel data read PD'.

For a general description of such a display system and the respective structure and operations of the circuits 100, 102, 104, 106 and 108 reference can thus be made to the description of FIG. 1, which applies in its entirety also to FIG. 2.

In the embodiment considered, the display system is comprises moreover a further processing circuit 110 configured to read pixel data PDa from the frame buffer 104 and verify the pixel data read PDa.

Specifically, in various embodiments, the digital processing circuit 110, such as a microprocessor programmed via software instruction and/or a hardware digital circuit, e.g. a Digital Signal Processor (DSP), is in addition to the processing circuit 102. Generally, the processing units 102 and 110 may use the same clock signal or preferably use different clock signals, e.g. clock signals obtained via two oscillators.

In various embodiments, the processing units 102 and 110 have different hardware architectures. For example, in various embodiments, the processing circuit 102 may be a Cortex M3 processor, while the processing circuit no may be a Cortex A7 processor. For example, such an asymmetric architecture (with two different processing units) permits that the processing circuit 102 may also comprise the hardware components used to interface to the source 100, while such circuits are not required for the processing circuit no. Moreover, while the processing circuit 102 may be dedicated to the generation of the pixel data PD, the processing circuit no could also perform different tasks. For example, such an asymmetric architecture may be implemented with an embedded system or a SoC (System on Chip). For example, a possible SoC solution is provided by the present applicant under the name "Accordo 5".

Alternatively, the processing circuit 110 and the processing circuit 102 may be implemented with two different threads or tasks run on the same microprocessor, possibly comprising also plural processing cores.

Accordingly, in various embodiments the processing circuit 102 is configured to:
- receive the analog or digital image/video data IMG from the source 100, e.g. via a Video Input Port (VIP) associated with the processing circuit 102,
- elaborate the image/video data IMG in order to generate the pixel data PD, and
- store the pixel data to the frame buffer 104.

Specifically, in various embodiments, the processing circuit 102 is configured to add integrity data to the pixel data PD, before these are stored to the frame buffer 104. For example, as schematically shown in FIG. 2, for this purpose the processing circuit 102 may store the elaborated image/video data IMG to a RAM 112, which may be internal or external with respect to the processing circuit 102, add the integrity data to the elaborated image/video data IMG stored to the RAM 112, and copy the image/video data IMG stored in the RAM 112 to the frame buffer 104.

Accordingly, in various embodiments, the processing circuit 110 is configured to read the pixel data PDa from the frame buffer, extract the integrity data from the pixel data PDa and determine whether the integrity data indicate a malfunctioning of the processing circuit 102. For example, in case the integrity data indicate a malfunctioning of the processing circuit 102, the processing system 110 may generate a warning/error signal ERR.

For example, in various embodiments, the processing circuit 102 is configured to change the position of the integrity data within the pixel data PD, e.g. for each frame or each given number of frames. In this case, the processing circuit 110 may thus verify whether the position of the integrity data within the pixel data changes, e.g. for each frame or each given number of frames.

For example, in various embodiments, when having detected a malfunctioning, the processing system 110 may store different pixel data to the frame buffer 104, wherein these pixel data may correspond to an image showing a warning message. Thus, when the graphic driver 106 reads the pixel data PD' from the frame buffer 104, the graphic display 108 will show the warning message.

As described in the foregoing, in various embodiments the processing circuit 102 adds integrity data to the pixel data PD. Specifically, in various embodiments, these integrity data are used to determine whether the pixel data PD stored to the frame buffer 104/the pixel data PD'/PDa read from the frame buffer 104 remain unchanged.

Specifically, in various embodiments, the integrity data are not appended as additional data to the pixel data PD, e.g. in the form of an additional signature, such as a hash key, but the integrity data are directly inserted into the pixel data PD, i.e. the processing circuit 102 is configured to replace a portion of the original pixel data PD (e.g. those store to the memory 112) with the integrity data. Accordingly, in various embodiments, one or more of the memory slots of the memory 112 and accordingly the frame buffer 104 will not contain the original pixel data determined by the processing circuit 102 as a function of the image data IMG, but the integrity data. Specifically, in various embodiments, the position of these one or more memory slots is not fixed but changes for each frame or each given number of frames, e.g. changes each time the pixel data PD are updated.

Figure 4:
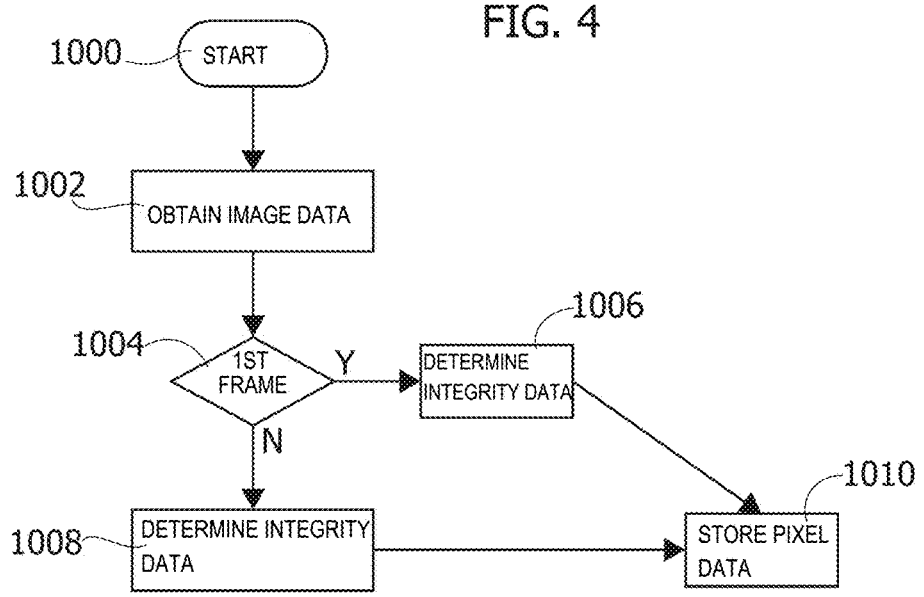
FIGS. 4 and 5 show embodiments of the operation of the display system of FIG. 2.

For example, FIG. 4 shows an embodiment of the operation of the processing circuit 102.

After a start step 1000, the processing circuit 102 obtains at a step 1002 the image data IMG for a new frame from the source 100 and determines the pixel data PD for the image data IMG read (representing the current frame). In various embodiments, the processing circuit 102 may store these pixel data PD to the memory 112.

At a step 1004, the processing circuit 102 verifies then whether the frame read at the step 1002 is the first frame.

In case the frame is the first frame (output "Y" of the step 1004), the processing circuit 102 proceeds to a step 1006 where the processing circuit 102 determines the integrity data for the current/first frame.

For example, in various embodiment, the integrity data ID consist of a sequence of a given number of bits, comprising:
- an integrity data field having a first number of bits, such as 16 bits;
- an optional position data field having a second number of bits, such as 8 bits; and
- an optional counter field having a third number of bits, such as 8 bit.

Generally, the processing circuit 102 may store a fixed (e.g. 0xABCD) or variable bit sequence to the integrity data field. For example, a fixed bit sequence permits to simplify the verification of the integrity data field. Conversely, a variable data field may be calculated as a function of the data of the other integrity data ID and/or the pixel data PD. For example, the integrity data ID may correspond to a checksum.

As mentioned before the integrity data ID are stored directly in the pixel data PD, wherein the position of the integrity data ID within the pixel data PD is variable.

Figure 3A:
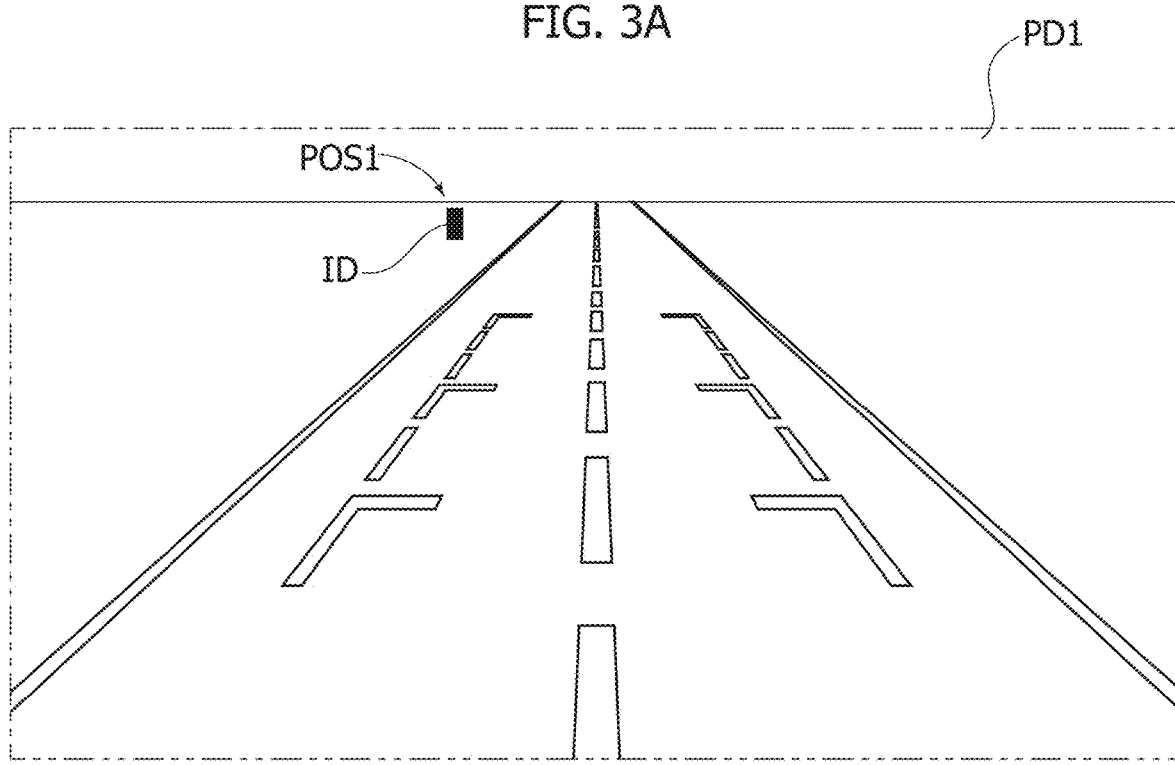
FIGS. 3A and 3B show two examples of pixel data used in the display system of FIG. 2.
Figure 3B:
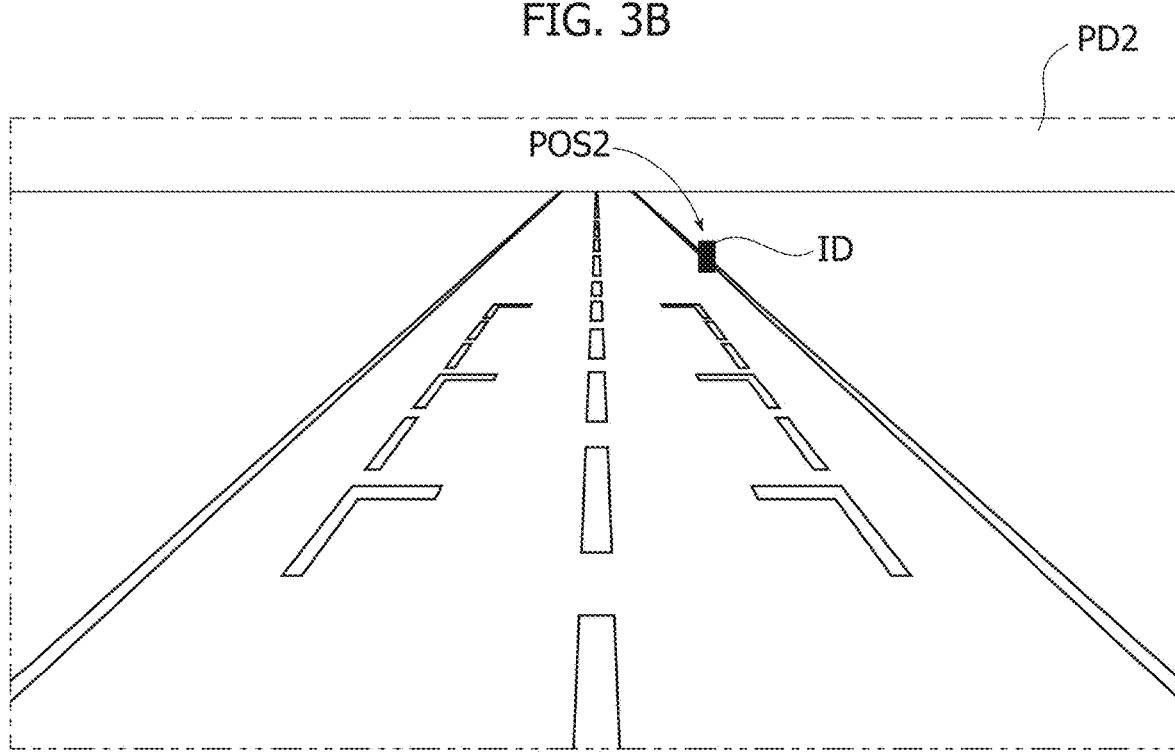

For example, this is schematically shown in FIGS. 3A and 3B, wherein FIG. 3A shows the pixel data PD1 of a frame/image and FIG. 3B shows the pixel data PD2 of the immediately following frame/image. Specifically, the integrity data ID are stored at a first position POS1 in the pixel data PD1 and at a second position POS2 in the pixel data PD2 (with POS2 being different from POS1).

Accordingly, knowing the position POS1, the processing circuit 102 should calculate the position POS2 for the next frame. Generally, any suitable mathematical function may be used for this purpose. For example, in various embodiments the next position POS2 is calculated by summing a given shift SH to the previous position POS2=POS1+SH. Generally, the shift SH may be fixed or variable, e.g. the shift may be a random number.

Accordingly, the optional position data field may be used to store the position of the integrity data in the next frame, e.g. POS2 for the integrity data ID for the pixel data PD1. Generally, the position data field is optional, because the position of the integrity data in the next frame could also be calculated from the previous position data when a given fixed mathematical function is used for the calculation of the next position, e.g. when the shift SH is constant or is varied according to a known mathematical function.

For example, in various embodiments, the position of the integrity data for the next frame is calculated as follows:

$$POS2=OFFSET+MULT*PDF$$

where OFFSET corresponds to a constant offset, such as 1600, MULT corresponds to a constant coefficient, such as 479, and PDF corresponds to a random number (e.g. in a range between 0 and 255) which is also stored to the position data field of the integrity data ID. For example, in this case, the position POS1 of the integrity data IF for the first frame may correspond to the value OFFSET.

Accordingly, in various embodiments, the processing circuit 102 is configured to perform the following operations at the step 1006:
  obtaining an initial position $POS_1$ for the first frame,
  calculating the position $POS_2$ for the next frame, and
  inserting the position $POS_2$ (or data being indicative for this position, such as the value PDF) into the position data field.

Finally, the optional counter field may be used to store a count value which is increased for each frame/image. For example, an 8-bit counter may essentially implement a modulo 256 operation of the frame number.

Accordingly, once the processing circuit 102 has determined the integrity data ID for the first frame, the processing circuit 102 may store the integrity data ID to the pixel data PD at the position POS1. For example, the processing circuit 102 may store for this purpose the integrity data ID to one or more memory locations in the memory 112, which are associated with the position POS1.

At a following step 1010, the processing circuit 102 may thus store the pixel data PD (as modified at the step 1006) to the frame buffer 104. For example, the processing circuit 102 may copy the content of the memory 112 to the frame buffer 104.

At the end of the step 1010, the processing circuit 102 may then return to the step 1002 for processing the next image.

Accordingly, when arriving again at the step 1004 and in case the frame is not the first frame (output "N" of the step 1004), the processing circuit 102 may proceed to a step 1008 where the processing circuit 102 determines the integrity data for the current frame.

Specifically, the operations at the step 1008 correspond to the operations performed at the step 1006, except for the fact that the position POS1 does not correspond to a fixed initial value, but the position POS1 corresponds to the position POS2 of the previous frame/iteration, i.e. the position POS1 (t) at an instant t, corresponds to the position POS2(t−1) at the previous instant (t−1). Accordingly, in line with the description of the step 1006, the processing circuit 102 may calculate the position POS2(t) for the instant t, e.g., as a function of the position POS1(t).

Accordingly, once the processing circuit 102 has determined the integrity data ID for the current frame, the processing circuit 102 may store the integrity data ID to the pixel data PD at the position POS1(t). For example, the processing circuit 102 may store for this purpose the integrity data ID to one or more memory locations in the memory 112, which are associated with the position POS1.

The processing circuit 102 may then proceed to the step 1010, where the processing circuit 102 stores the pixel data PD (as modified at the step 1008) to the frame buffer 104. For example, the processing circuit 102 may again copy the content of the memory 112 to the frame buffer 104.

Figure 5:
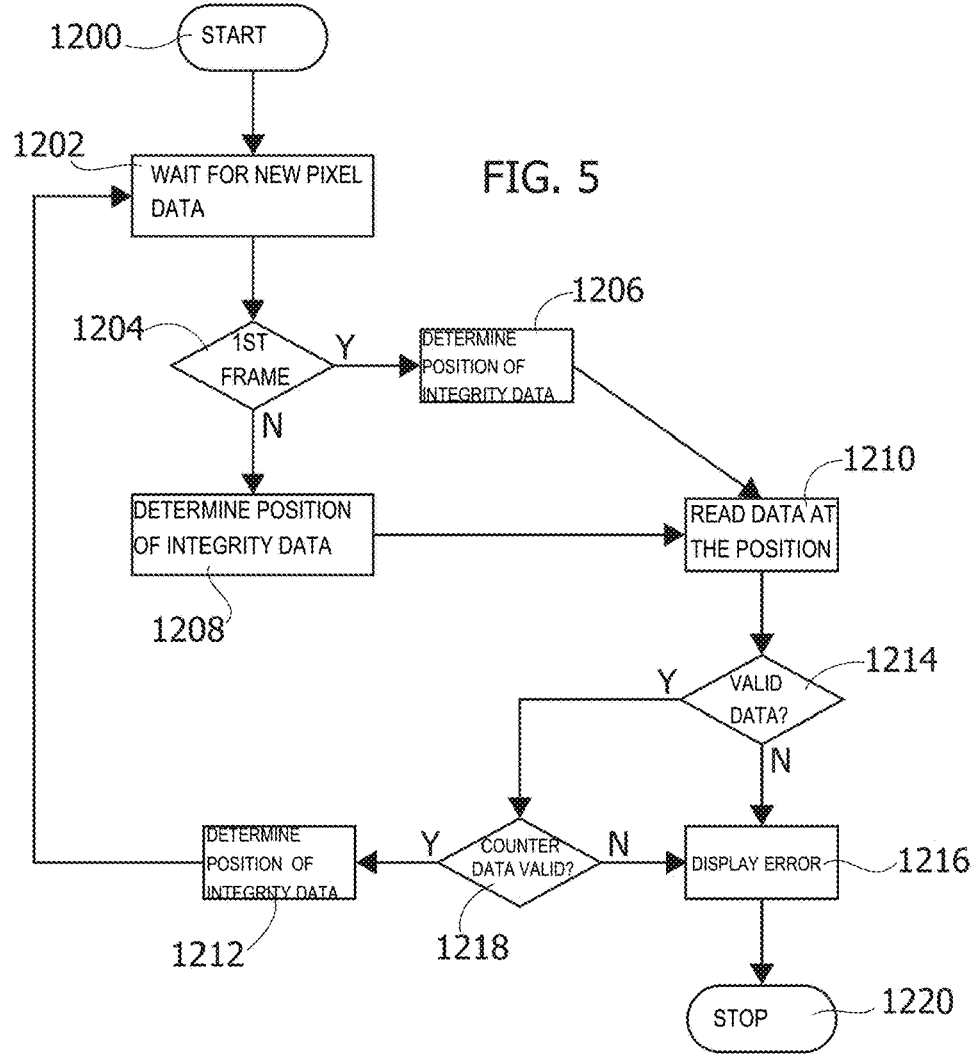

FIG. 5 shows an embodiment of the operation of the processing circuit 110.

In the embodiment considered, after a start step 1200, the processing circuit 110 proceeds to a step 1202 where the processing circuit 110 waits that new pixel data PD have been stored to the frame buffer 104. For example, for this purpose the processing circuit 102 or the frame buffer 104 may generate an interrupt for the processing circuit 110, e.g.:
  when the processing circuit 102 has written all pixel data PD to the frame buffer 104, or
  when a given (last) memory location of the frame buffer 104 is written.

Once new pixel data (indicative of a new image/frame) have been written to the frame buffer 104, the processing circuit 110 proceeds to a step 1204. At the step 1204, the processing circuit 110 verifies whether the new pixel data PD correspond to a first frame.

In case the frame is the first frame (output "Y" of the step 1204), the processing circuit 110 proceeds to a step 1206 where the processing circuit 102 determines the position of the integrity data for the current/first frame. As mentioned before, the position data for the first frame may be fixed (and correspond to the position data of the first frame used by the processing circuit 102).

Next, the processing circuit 110 proceeds to a step 1210, where the processing circuit 110 reads the data at the position (determined at the step 1204) from the frame buffer 104, which should comprise the integrity data ID.

Once having read the bit sequence associated to the integrity data, the processing circuit 110 proceeds to a verification step 1214, where the processing verifies the content of the set of bits associated to the integrity data field. For example, when using a fixed bit sequence, the processing circuit 110 may compare the content of the bit sequence read from the frame buffer 104 with this fixed bit sequence.

In case the integrity data field contains invalid data (output "N" of the verification step 1214), the processing circuit proceeds to an error step 1216, where the processing circuit 110 shows the previously described error/warning message, and the procedure terminates at a step 1220.

In case the integrity data field contains valid data (output "Y" of the verification step 1214), the processing circuit proceeds to an optional verification step 1218, where the processing circuit 110 verifies also the content of the counter field. For example, the processing circuit 110 may verify whether the counter field has been increased by one with respect to the previous iteration, i.e. with respect to the previous counter field of the integrity data read from the frame buffer 104.

In case the counter field contains invalid data (output "N" of the verification step 1218), the processing circuit may again proceed to the error step 1216.

Conversely, in case the counter field contains valid data (output "Y" of the verification step 1218), the processing circuit proceeds to the step 1220, where the processing circuit 110 determines the position of the integrity data ID of the next frame. Specifically, the position of the integrity data ID of the next frame may be determined as a function of the position of the integrity data ID of the current frame and/or may be stored also to the optional position data field. Thus, in various embodiments, the processing circuit may determine the position of the integrity data ID of the next frame by reading the content of the position data field.

At the end of the step 1212, the processing circuit 110 may then return to the step 1202 for processing the next frame.

Accordingly, when arriving again at the step 1204 and in case the frame is not the first frame (output "N" of the step 1204), the processing circuit no may proceed to a step 1208 where the processing circuit no determines the position of the integrity data for the current frame. As mentioned before, the position data for the following frames are already determined at the step 1212. Accordingly, the processing circuit no may determine the position of the integrity data at the step 1208 and proceed to the step 1210, where the processing circuit no reads the data at the position (determined at the step 1208) from the frame buffer 104, which should comprise the integrity data ID.

Accordingly, by verifying the integrity data ID, the processing circuit 110 may verify whether the pixel data PD change, irrespective of the fact whether the actual image data IMG change. In fact, the proposed solution essentially verifies whether the position of the integrity data ID (and the content of the integrity data ID) within the pixel data PD change correctly during a sequence of frames stored to the frame buffer 104.

Specifically, in various embodiments, the display system is comprises essentially three circuits which operate in parallel:
the first circuit 102 is configured to acquire the image/video data IMG from the camera 100 and store the processed pixel data PD (including the integrity data ID) to the frame buffer 104;
the second circuit 106 is configured to read the pixel data PD' from the frame buffer 106 and generate the drive signal DRV for the graphic display 108; and
the third circuit 110 is configured to read the pixel data PDa from the frame buffer 106 and verify the integrity data ID.

For example, as described in the foregoing, the processing circuit 102 may use a Video Input Port (VIP) hardware to obtain the image data from the source 100. For example, in various embodiments an 8-bit parallel VIP may be used. For example, such a VIP usually already stores the image data IMG to a memory (representing thus the memory 112 of FIG. 2) being internal to the processing unit 102. Next a Smart Graphic Accelerator (SGA) of the processing circuit 102 may be configured to copy each line from the memory 112 of the VIP to a RAM (representing thus the frame buffer 104 of FIG. 2), which may be external to the processing circuit 102, such as a Double Data Rate Synchronous Dynamic Random-Access Memory (DDR SDRAM). Accordingly, in this case, the processing circuit 102 may store the integrity data ID to the pixel data PD in the memory 104 by either modifying the pixel data PD in the internal RAM 112 before the SGA copies the data to the memory 104 or by modifying the pixel data PD in the memory 104 once the SGA has copied the data to the memory 104. Accordingly, the memory 104 may also be interfaced with the processing circuit 110 and the driver 106. Generally, the processing circuit 102, the processing circuit 110 and the driver 106 may be interfaced with the memory 104 via a single DMA channel, e.g. by using a shared bus system, or by using plural DMA channels.

As described in the foregoing, the present display system 1a may be particularly suitable for a rear camera system of a vehicle. For example, in this case, the display system 1a may be started (e.g. steps 1000 and 1200 may be started) when the rear gear of the vehicle is inserted. For example, for this purpose, the display system 1a may receive a start signal, e.g. indicative of the insertion of the rear gear, and the display system 1a may be configured to start the acquisition of the image/video data IMG (step 1002) and the parallel processing of the pixel data in the frame buffer 104 in response to this start signal.

Generally, the display system 1a may thus also form part of a more complex system, such as the infotainment system of a vehicle, which e.g. manages also other functions, such as a radio, a navigator, etc.

Of course, without prejudice to the principle of the invention, the details of construction and the embodiments may vary widely with respect to what has been described and illustrated herein purely by way of example, without thereby departing from the scope of the present invention, as defined by the ensuing claims.

What is claimed is:
1. A display system comprising:
a video source configured to generate image data comprising a sequence of images;
a graphic display having a given resolution of pixels;
a frame buffer configured to store an image frame to be displayed on the graphic display, the image frame comprising pixel data for the graphic display;
a first processing circuit configured to receive the image data from the video source, and generate a current image frame by generating the pixel data as a function of the image data and storing the pixel data to the frame buffer;
a graphic video driver configured to display the image frame by reading the pixel data from the frame buffer and generating drive signals for the graphic display as a function of the pixel data read;
the first processing circuit configured to insert integrity data into the pixel data of the current image frame, and change a position of the integrity data within the pixel data in the frame buffer, with respect to a fixed initial value or with respect to a previous image frame; and
a second processing circuit configured to read the pixel data from the frame buffer and verify whether the position of the integrity data within the pixel data actually changed from one position to another position in the frame buffer.
2. The display system according to claim 1, wherein the first processing circuit is configured to change the position of the integrity data within the pixel data for each frame or each given number of frames, and wherein the second processing circuit is configured to verify whether the posi- tion of the integrity data within the pixel data changes for each frame or each given number of frames, respectively.

3. The display system according to claim 1, wherein the second processing circuit is configured to, when the position of the integrity data within the pixel data does not change, generate an error signal.

4. The display system according to claim 3, wherein the second processing circuit is configured to, when the position of the integrity data within the pixel data does not change, generate a warning image frame by storing further pixel data to the frame buffer, the further pixel data corresponding to an image showing a warning message.

5. The display system according to claim 1, wherein the first processing circuit is configured to:
   when the current image frame is a first image frame, determine the position of the integrity data within the pixel data of the current image frame as a function of the fixed initial value; and
   when the current image frame is not the first image frame, determine the position of the integrity data within the pixel data of the current image frame as a function of the position of the integrity data within the pixel data of the previous image frame.

6. The display system according to claim 1, wherein the integrity data comprise a position data field, wherein the first processing circuit is configured to determine the position of the integrity data within the pixel data of a next image frame, and store data identifying the position of the integrity data within the pixel data of the next image frame to the position data field, and wherein the second processing circuit is configured to verify a content of the position data field.

7. The display system according to claim 1, wherein the integrity data comprise an integrity data field, wherein the first processing circuit is configured to store a fixed bit sequence to the integrity data field, and wherein the second processing circuit is configured to verify a content of the integrity data field.

8. The display system according to claim 1, wherein the integrity data comprise a counter field, wherein the first processing circuit is configured to increase a count value for each frame or each given number of frames, and store the count value to the counter field, and wherein the second processing circuit is configured to verify a content of the counter field.

9. The display system according to claim 1, wherein the first processing circuit is configured to:
   elaborate the image data received from the video source in order to generate the pixel data of the current image frame;
   store the pixel data of the current image frame to a memory;
   copy the pixel data of the current image frame stored to the memory to the frame buffer;
   determine a current position of the integrity data within the pixel data of the current image frame; and either:
      store the integrity data to a memory location in the memory associated with the current position before the pixel data of the current image frame are copied to the frame buffer; or
      store the integrity data to the memory location in the frame buffer associated with the current position after the pixel data of the current image frame are copied to the frame buffer.

10. A vehicle comprising:
    a cockpit;
    a video source configured to generate image data comprising a sequence of images, wherein the video source is a camera is mounted at a rear of the vehicle;
    a graphic display having a given resolution of pixels, wherein the graphic display is mounted in the cockpit;
    a frame buffer configured to store an image frame to be displayed on the graphic display, the image frame comprising pixel data for the graphic display;
    a first processing circuit configured to receive the image data from the video source, and generate a current image frame by generating the pixel data as a function of the image data and storing the pixel data to the frame buffer;
    a graphic video driver configured to display the image frame by reading the pixel data from the frame buffer and generating drive signals for the graphic display as a function of the pixel data read;
    wherein the first processing circuit is configured to insert integrity data into the pixel data of the current image frame, and change a position of the integrity data within the pixel data in the frame buffer, with respect to a fixed initial value or with respect to a previous image frame; and
    a second processing circuit configured to read the pixel data from the frame buffer and verify whether the position of the integrity data within the pixel data actually changed from one position to another position in the frame buffer.

11. A method of operating a display system, comprising:
    providing image data comprising a sequence of images;
    generating a current image frame as a function of the image data, the current image frame comprising pixel data;
    inserting integrity data into the pixel data;
    attempting to change, by a first processing circuit, a position of the integrity data within the pixel data, with respect to a fixed initial value or with respect to a previous image frame;
    storing, by the first processing circuit, the pixel data and the integrity data to a frame buffer;
    displaying the current image frame on a graphic display by reading the pixel data from the frame buffer; and
    verifying, by a second processing circuit, whether the position of the integrity data within the stored pixel data actually changed from one position to another position in the frame buffer.

12. The method according to claim 11, further comprising:
    changing the position of the integrity data within the pixel data for each frame or each given number of frames; and
    verifying whether the position of the integrity data within the pixel data changes for each frame or each given number of frames, respectively.

13. The method according to claim 11, further comprising, in response to the position of the integrity data within the pixel data not changing, generating an error signal.

14. The method according to claim 13, further comprising, in response to the position of the integrity data within the pixel data not changing, generating a warning image frame by storing further pixel data to the frame buffer, the further pixel data corresponding to an image showing a warning message.

15. The method according to claim 11, further comprising:
    in response to the current image frame being a first image frame, determining the position of the integrity data within the pixel data of the current image frame as a function of the fixed initial value; or in response to the current image frame not being the first image frame, determining the position of the integrity data within the pixel data of the current image frame as a function of the position of the integrity data within the pixel data of the previous image frame.

16. The method according to claim 11, wherein the integrity data comprise a position data field, the method further comprising:

determining the position of the integrity data within the pixel data of a next image frame;

storing data identifying the position of the integrity data within the pixel data of the next image frame to the position data field; and verifying a content of the position data field.

17. The method according to claim 11, wherein the integrity data comprise an integrity data field, the method further comprising:

storing a fixed bit sequence to the integrity data field; and verifying a content of the integrity data field.

18. The method according to claim 11, wherein the integrity data comprise a counter field, the method further comprising:

increasing a count value for each frame or each given number of frames;

storing the count value to the counter field; and verifying a content of the counter field.

19. The method according to claim 11, further comprising:

elaborating the image data in order to generate the pixel data of the current image frame;

storing the pixel data of the current image frame to a memory;

copying the pixel data of the current image frame stored to the memory to the frame buffer;

determining a current position of the integrity data within the pixel data of the current image frame; and either:

storing the integrity data to a memory location in the memory associated with the current position before the pixel data of the current image frame are copied to the frame buffer; or storing the integrity data to the memory location in the frame buffer associated with the current position after the pixel data of the current image frame are copied to the frame buffer.

\* \* \* \* \*